United States Patent [19]

Pelegris et al.

[11] Patent Number: 5,696,820
[45] Date of Patent: Dec. 9, 1997

[54] TELEPHONE AND DATA COMMUNICATIONS LINE CONDITIONER SYSTEM

[75] Inventors: Dimitris Jim Pelegris, Mount Prospect; Murray Delamoreaux, Hoffman Estates; Michelle Hahnlein, Lindenhurst; Terry Drake, Island Lake, all of Ill.

[73] Assignee: Oneac Corporation, Libertyville, Ill.

[21] Appl. No.: 703,520

[22] Filed: Aug. 27, 1996

Related U.S. Application Data

[63] Continuation-in-part of Ser. No. 527,771, Sep. 13, 1995, abandoned.

[51] Int. Cl.[6] .................................................. H02H 1/00
[52] U.S. Cl. .......................... 379/399; 379/412; 379/331; 361/119
[58] Field of Search .............................. 379/412, 399, 379/331, 332, 19, 326, 327; 361/119

[56] References Cited

U.S. PATENT DOCUMENTS

| | | | |
|---|---|---|---|
| 4,087,655 | 5/1978 | Massey | 179/175 |
| 4,309,736 | 1/1982 | Lissillour | 361/119 |
| 4,313,147 | 1/1982 | Uchida et al. | 361/119 |
| 4,331,839 | 5/1982 | Baumbach | 179/98 |
| 4,616,288 | 10/1986 | Scholtholt et al. | 361/119 |
| 4,667,272 | 5/1987 | Fasano | 361/394 |
| 4,729,064 | 3/1988 | Singer, Jr. | 361/426 |
| 4,758,920 | 7/1988 | McCartney | 361/119 |
| 4,846,735 | 7/1989 | Teichler et al. | 439/709 |
| 4,856,060 | 8/1989 | Meyerhoefer et al. | 379/412 |
| 4,901,190 | 2/1990 | Scholtholt | 361/119 |
| 4,905,275 | 2/1990 | Meyerhoefer et al. | 379/327 |
| 4,924,345 | 5/1990 | Siemon et al. | 361/111 |
| 4,941,063 | 7/1990 | McCartney et al. | 361/119 |
| 5,299,088 | 3/1994 | Honl et al. | 361/119 |
| 5,341,269 | 8/1994 | Hayward et al. | 361/119 |

(List continued on next page.)

FOREIGN PATENT DOCUMENTS

| | | |
|---|---|---|
| 133409 | 12/1994 | Canada. |
| 338187B1 | 12/1993 | European Pat. Off.. |
| 0645842 | 3/1995 | European Pat. Off.. |

OTHER PUBLICATIONS

Examiner's Search Report of 26 Nov. 96 in corresponding GB Application GB 9618910.5.

Anixer Brochure, Krone Wiring System pp. 1–151, 1–152, dated 1995.

*Primary Examiner*—Fan S. Tsang
*Assistant Examiner*—Devendra Kumar
*Attorney, Agent, or Firm*—Mason, Kolehmainen, Rathburn and Wyss

[57] ABSTRACT

A line conditioner system is provided for use with an in-line wire terminating base for terminating a plurality of telephone line pairs. The line conditioner system includes an electrical grounding, earthing bar and an integral module for conditioning a single telephone line pair. The electrical grounding, earthing bar extends along the length of the in-line wire terminating base and includes a pair of electrical grounding terminals received in electrical and mechanical contact engagement with an electrical grounding member of the in-line wire terminating base. The electrical grounding, earthing bar includes an elongated straight plate portion extending between the pair of electrical grounding terminals. The electrical grounding earthing bar is configured for easy assemble, manufacture and cleanability. The integral module includes a printed wiring board carrying protection circuitry for conditioning the single telephone line pair. The integral module includes a unitary base and a unitary, outwardly extending cover that cooperatively define a cavity for containing the printed wiring board. The unitary, outwardly extending cover includes a first end mating with the unitary base and a second opposed end, and the second opposed end includes features to facilitate removal of the integral module from the in-line wire terminating base, such as a flange, an aperture and thumb grips.

19 Claims, 5 Drawing Sheets

U.S. PATENT DOCUMENTS

| | | | |
|---|---|---|---|
| 5,357,568 | 10/1994 | Pelegris | 361/119 |
| 5,359,657 | 10/1994 | Pelegris | 379/412 |
| 5,490,215 | 2/1996 | Pelegris | 379/412 |
| 5,504,654 | 4/1996 | Knox et al. | 361/119 |
| 5,509,066 | 4/1996 | Saligny | 379/327 |
| 5,515,436 | 5/1996 | Bonvallat | 379/412 |
| 5,546,267 | 8/1996 | Frederiksen et al. | 361/119 |
| 5,555,153 | 9/1996 | Frederiksen et al. | 361/119 |
| 5,596,475 | 1/1997 | Figueiredo et al. | 361/119 |
| 5,627,721 | 5/1997 | Figueiredo et al. | 361/119 |

TELEPHONE AND DATA COMMUNICATIONS LINE CONDITIONER SYSTEM

RELATED APPLICATION

This application is a continuation-in-part of application Ser. No. 08/527,771, filed Sep. 13, 1995, abandoned.

FIELD OF THE INVENTION

The present invention relates to a telephone and data communications line conditioner system, and more particularly to a line conditioner system used with an in-line, wire-terminating connector base for a plurality of telephone line pairs including an electrical grounding, earthing bar and an integral module for a single telephone line pair.

DESCRIPTION OF THE PRIOR ART

Overvoltage protection devices are commonly used with telephone lines for protecting telephone equipment against hazardous voltages. Sources of transients include lightning, inductive switching electromagnetic interference (EMI), electrostatic discharge (ESD) and nuclear EMP (NEMP). Overvoltage protection circuitry that overcomes many disadvantages of the prior art circuitry is disclosed in Pelegris, U.S. Pat. No. 5,357,568, issued Oct. 18, 1994, Pelegris, U.S. Pat. No. 5,359,657, issued Oct. 25, 1994, McCartney, U.S. Pat. No. 4,758,920, issued Jul. 19, 1988 and McCartney et al., U.S. Pat. No. 4,941,063, issued Jul. 10, 1990 and assigned to the assignee of the present invention.

A disadvantage of some known overvoltage protection arrangements is that multiple protection modules for a plurality of telephone line pairs are provided in close proximity to each other so that both insertion and removal of a particular module is difficult. Typically in such arrangements, a special tool is required to remove one of protection modules, such as when a module fails and must be removed for repair or replacement. Another disadvantage is the difficulty to provide efficient, effective and reliable electrical grounding connections to the multiple protection modules. A need exists for an improved integral module for a single telephone line pair adapted for use with a wire terminating base for a plurality of telephone line pairs and an electrical grounding arrangement for such integral modules.

SUMMARY OF THE INVENTION

Important objects of the present invention are to provide an improved telephone and data communications line conditioner system, to provide a line conditioner system for use with an in-line connector base terminating a plurality of telephone line pairs including an electrical grounding, earthing bar and an integral module for a single telephone line pair; and to provide such a system overcoming many of the disadvantages of prior art arrangements.

In brief, a line conditioner system is provided for use with an in-line wire terminating base for terminating a plurality of telephone line pairs. The line conditioner system includes a unitary electrical grounding, earthing bar and an integral module for conditioning a single telephone line pair. The electrical grounding, earthing bar extends along the length of the in-line wire terminating base and includes a pair of electrical grounding terminals received in electrical and mechanical contact engagement with an electrical grounding member of the in-line wire terminating base. The electrical grounding, earthing bar includes an elongated straight plate portion extending between the pair of electrical grounding terminals. The integral module includes a printed wiring board carrying protection circuitry for conditioning the single telephone line pair. The protection circuit includes an electrical grounding terminal. The printed wiring board including a terminal end portion having a first pair of contacts for connecting with an INPUT TIP/A line and an INPUT RING/B line and a second pair of contacts for connecting with an OUTPUT TIP/A line and an OUTPUT RING/B line. The integral module includes a base and a cover that cooperatively define a cavity for containing the printed wiring board. The base defines a printed wiring board terminal end portion receiving cavity receiving the printed wiring board terminal end portion and a protection circuit grounding terminal receiving cavity for receiving and positioning the protection circuit grounding terminal in electrical and mechanical contact engagement with the electrical grounding, earthing bar. The unitary, outwardly extending cover includes a first end mating with the unitary base and a second opposed end, and the second opposed end includes a flange to facilitate removal of the integral module from the in-line wire terminating base.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
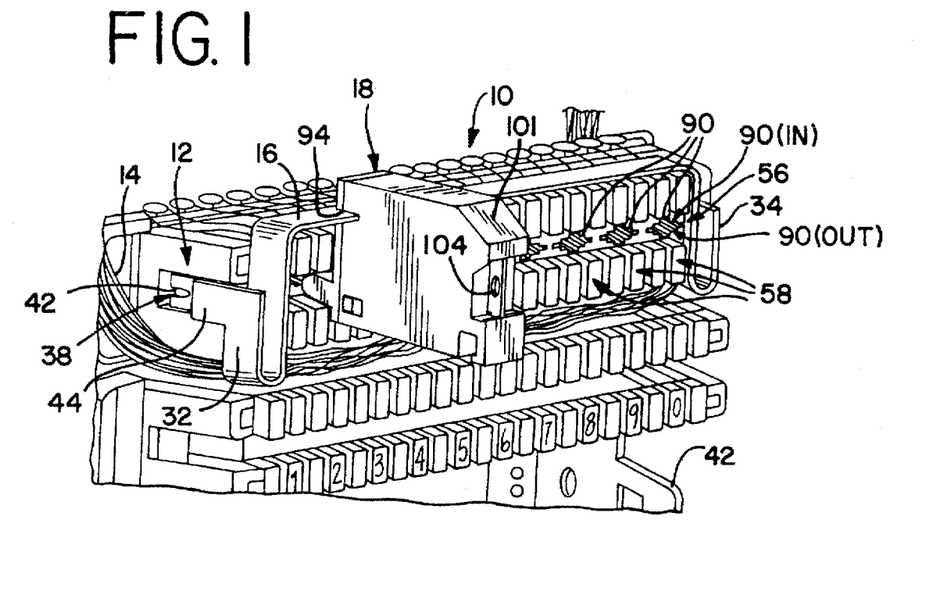
FIG. 1 is a perspective view of a line conditioner system including an electrical grounding, earthing bar with a fragmentary portion of an in-line, wire terminating connector base for a plurality of telephone line pairs in accordance with the present invention.

Having reference now to FIG. 1, there is shown a line conditioner system generally designated by the reference character 10 used with an in-line, wire terminating connector base 12 for a plurality of telephone line pairs 14. Line conditioner system 10 includes an electrical grounding, earthing bar 16 and at least one integral module 18 for a single telephone line pair 14'.

Figure 2:
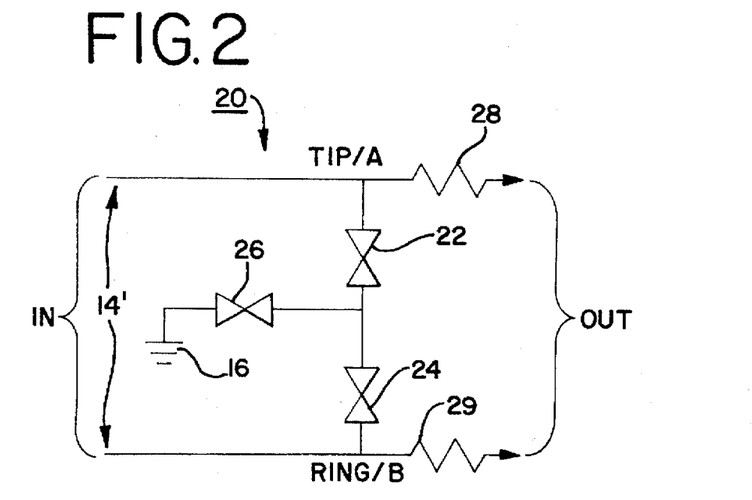
FIG. 2 is a schematic diagram illustrating protection circuitry of the line conditioner system of FIG. 1.

Referring also to FIG. 2, there is shown a protection circuit generally designated by 20 included within module 18. Protection circuit 20 includes a plurality of transient voltage clamping devices 22, 24 and 26 connected between the earthing bar 16 and the telephone line pair 14', as shown, and a pair of current limiting resistors 28 and 29 connected in series with the TIP/A, RING/B lines, respectively. Protection circuit 20 advantageously is of the type disclosed in the above described Pelegris, U.S. Pat. No. 5,357,568, issued Oct. 18, 1994, Pelegris, U.S. Pat. No. 5,359,657, issued Oct. 25, 1994, McCartney, U.S. Pat. No. 4,758,920, issued Jul. 19, 1988 and McCartney et al., U.S. Pat. No. 4,941,063, issued Jul. 10, 1990. The subject matter of the above-identified patents is incorporated herein by reference.

Figure 3:
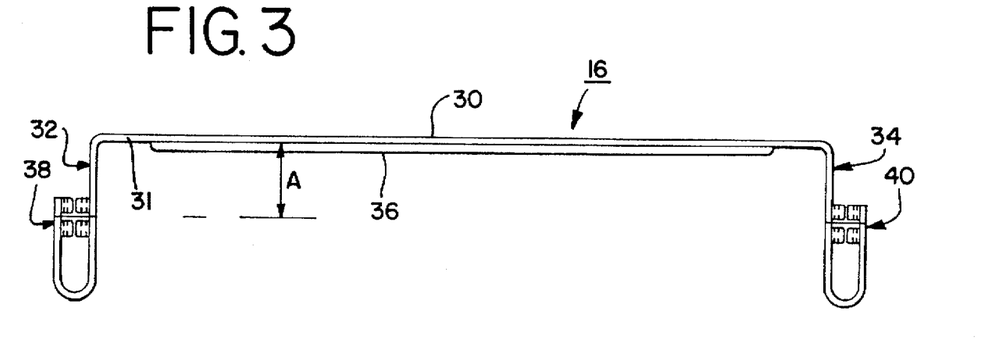
FIG. 3 is a top plan view of an electrical grounding earthing bar of the line conditioner system of FIG. 1.
Figure 4:
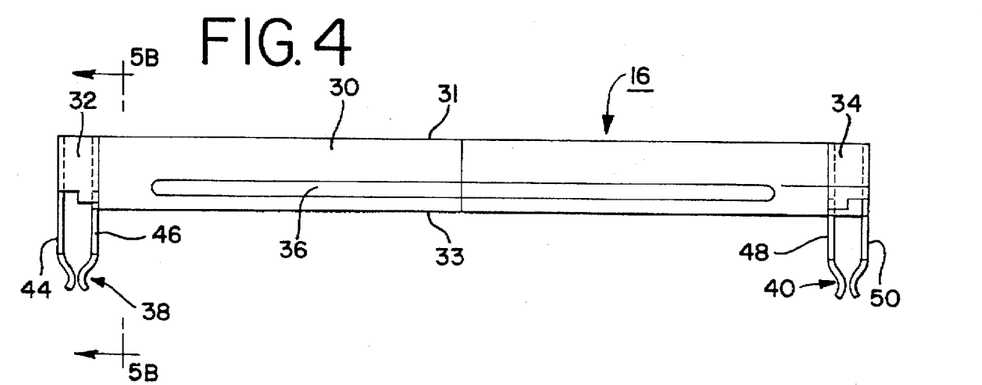
FIG. 4 is a side plan view of the electrical grounding earthing bar of the line conditioner system of FIG. 1.
Figure 5A:
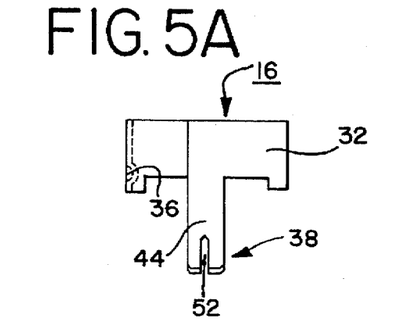
FIG. 5A is an end plan view of the electrical grounding earthing bar of the line conditioner system of FIG. 1.
Figure 5B:
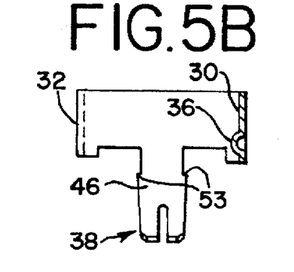
FIG. 5B is a plan view of the electrical grounding earthing bar taken along line 5B—5B of FIG. 4.
Figure 6:
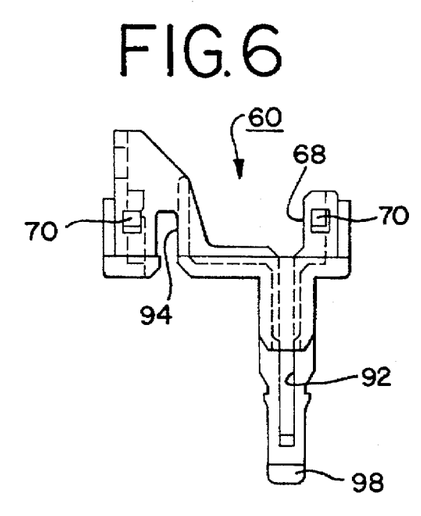
FIG. 6 is a side plan view of a housing base of an integral conditioner module for a single telephone line pair of the line conditioner system of FIG. 1 with interior details illustrated in dotted line.
Figure 7:
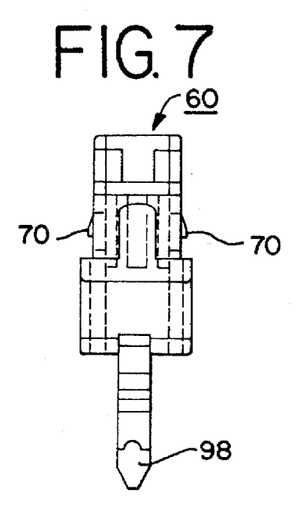
FIG. 7 is a first end plan view of the housing base of an integral conditioner module for a single telephone line pair of the line conditioner system of FIG. 1 with interior details illustrated in dotted line.
Figure 8:
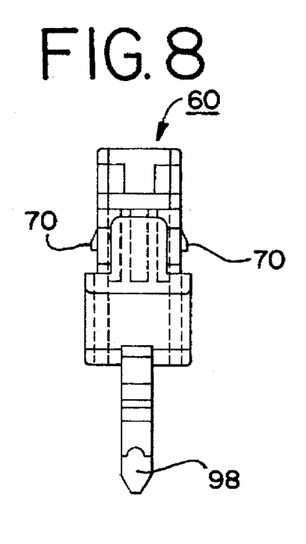
FIG. 8 is a second end plan view of the housing base of an integral conditioner module for a single telephone line pair of the line conditioner system of FIG. 1 with interior details illustrated in dotted line.
Figure 9:
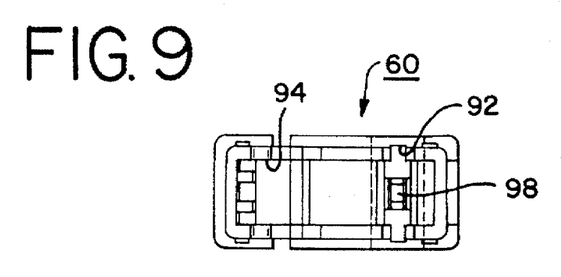
FIG. 9 is an inside cover mating plan view of the housing base of an integral conditioner module for a single telephone line pair of the line conditioner system of FIG. 1 with interior details illustrated in dotted line.
Figure 10:
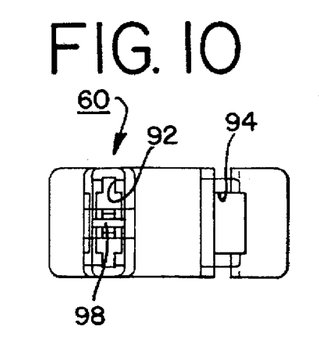
FIG. 10 is an outside plan view of the housing base of an integral conditioner module for a single telephone line pair of the line conditioner system of FIG. 1.

Referring now to FIGS. 3, 4, 5A and 5B, the electrical grounding earthing bar 16 is shown. Earthing bar 16 is a unitary, stamped and formed member formed of an electrically conductive sheet metal material, such as, copper or phosphorous bronze, 20 gage. Earthing bar 16 includes an elongated, plate or bar 30 extending in a plane between opposed generally U-shaped ends 32 and 34. Elongated bar portion 30 is generally rectangular including opposed, parallel edges 31 and 33. An elongated, stiffening indent 36 is formed in the elongated bar 30 provides increased rigidity to avoid twisting of the bar member. A pair of electrical grounding terminals or clips 38 and 40 are received in electrical and mechanical contact engagement with an electrical grounding member 42 (FIG. 1) defined by the in-line connector base 12. The U-shaped ends 32 and 34 include a pair of outwardly extending arms 44, 46 and 48, 50, each having a generally centrally disposed terminal end notch or cut-out portion 52 forming the respective terminals 38 and 40. A pair of locking ledges 53 formed in arms 46 and 48 are received in snap-fit attachment with the in-line connector base 12. As best seen referring FIGS. 1 and 3, the U-shaped ends 32 and 34 of earthing bar 16 have an overall height slightly greater than the height of a row 56 of the multiple in-line wire terminating connectors 58. The height from the centerline of the terminals 38 and 40 indicated by an arrow A in FIG. 3 is selected to correspond to the height of the terminating connectors 58. The overall length of the earthing bar 16 is provided to correspond to the overall length of the connector row 56. The straight elongated bar portion 30 of the electrical grounding earthing bar 16 facilitates ease of use and ease of cleaning. The electrical grounding earthing bar 16 having an overall simple shape is easy assemble with the connector base 12 and with multiple modules 18. The overall simple shape of the electrical grounding earthing bar 16 facilitates ease of manufacture.

Figure 11:
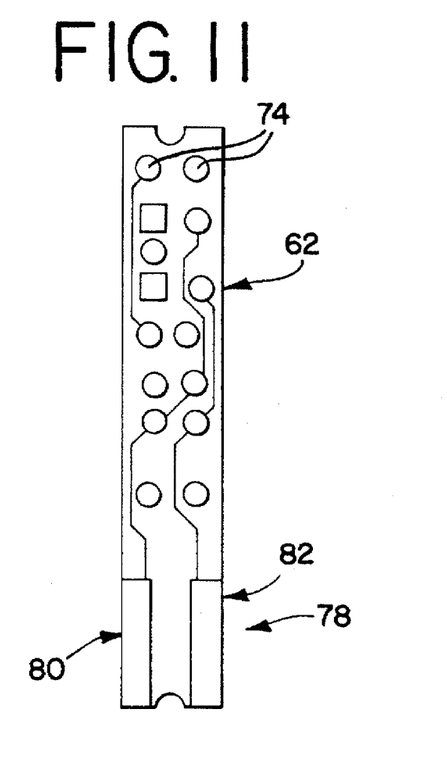
FIG. 11 is a bottom plan view of a printed wiring board of the integral conditioner module for a single telephone line pair of the line conditioner system of FIG. 1.
Figure 12:
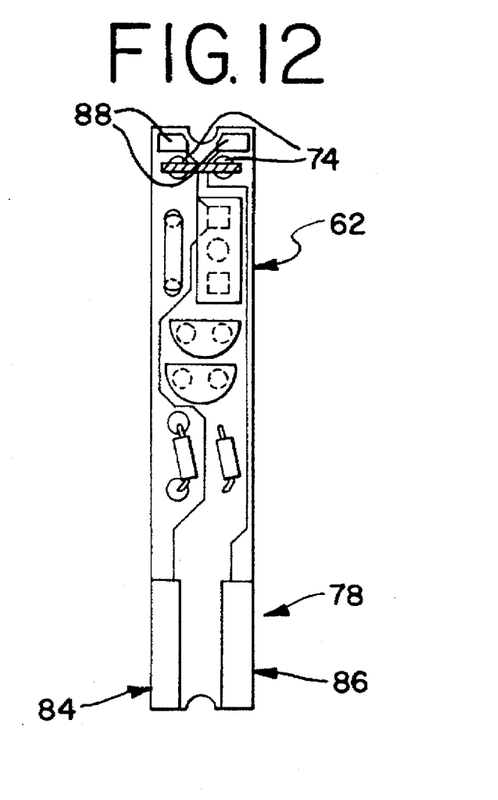
FIG. 12 is a top plan view of the printed wiring board of the integral conditioner module for a single telephone line pair of the line conditioner system of FIG. 1.
Figure 13:
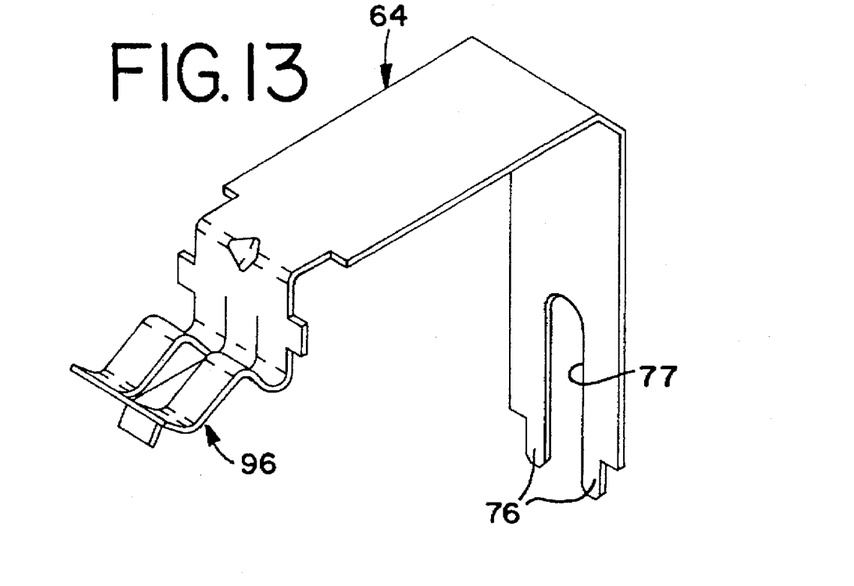
FIG. 13 is a perspective view of an electrical grounding terminal of the integral conditioner module for a single telephone line pair of the line conditioner system of FIG. 1.
Figure 14:
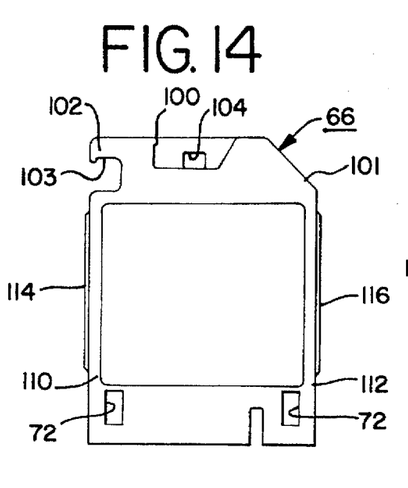
FIG. 14 is a first side plan view of a housing cover of the integral conditioner module for a single telephone line pair of the line conditioner system of FIG. 1.
Figure 15:
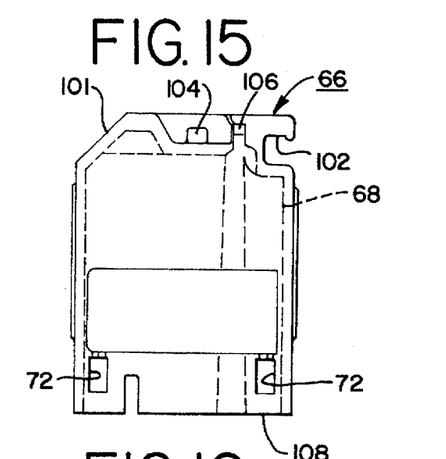
FIG. 15 is a second side plan view of the housing cover of the integral conditioner module for a single telephone line pair of the line conditioner system of FIG. 1.
Figure 16:
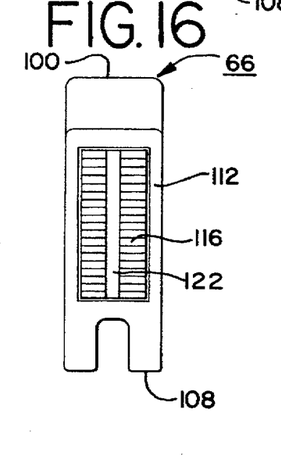
FIG. 16 is a first end plan view of the housing cover of the integral conditioner module for a single telephone line pair of the line conditioner system of FIG. 1.
Figure 17:
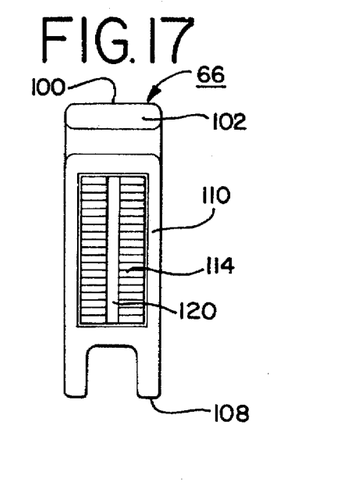
FIG. 17 is a second end plan view of the housing cover of the integral conditioner module for a single telephone line pair of the line conditioner system of FIG. 1.
Figure 18:
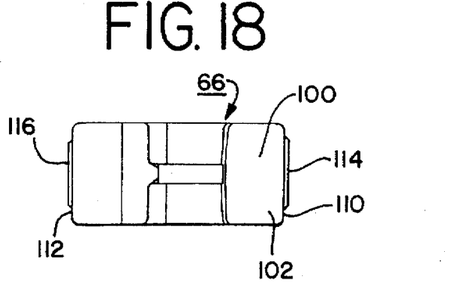
FIG. 18 is an outside plan view of the housing cover of the integral conditioner module for a single telephone line pair of the line conditioner system of FIG. 1.
Figure 19:
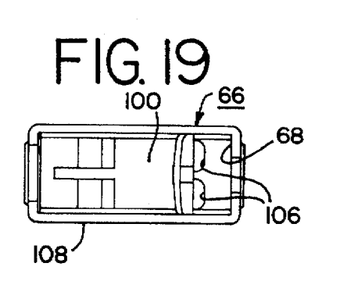
FIG. 19 is an inner, base mating face plan view of the housing cover of the integral conditioner module for a single telephone line pair of the line conditioner system of FIG. 1.

Referring now to FIGS. 6–19, the integral module 18 includes a housing base 60 shown in FIGS. 6–10, a printed wiring board 62 carrying the protection circuitry 20 shown in FIG. 2 and including a generally L-shaped electrical grounding member 64 shown in FIGS. 11, 12 and 13, and a housing cover 66 shown in FIGS. 14–19. The housing base 60 and housing cover 66 together define a cavity 68 containing the printed wiring board 62 and the electrical grounding member 64. The housing base 60 and housing cover 66 include cooperating latching ledges 70 and latching apertures 72, respectively for snap-fit engagement to retain the base and cover together. The housing base 60 and housing cover 66 are unitary members formed of an electrically insulating synthetic material by injection molding technique.

Referring to FIGS. 11–13, printed wiring board 62 includes a pair of apertures 74 receiving and electrically connected to a pair of corresponding downwardly depending legs 76 of the electrical grounding member 64. A U-shaped cutout portion 77 is defined between the legs 76. The printed wiring board 62 includes a terminal end portion generally designated by 78 carrying a first pair of contacts 80 and 82 and a second pair of contacts 84 and 86 provided on opposites sides of the printed wiring board. A pair of test pads 88 are formed integral with the printed wiring board 62 to facilitate testing of the module 18. The first pair of contacts 80 and 82 are connected with an OUTPUT TIP/A line and an OUTPUT RING/B line and a second pair of contacts 84 and 86 are connected with an INPUT TIP/A line and an INPUT RING/B line when the module 18 is inserted into one of a plurality of single line pair receptacles 90 (FIG. 1) of the in-line connector base 12. Each line pair receptacle 90 is connected to the INPUT TIP/A and INPUT RING/B lines indicated by 90(IN) and is connected to the OUTPUT TIP/A and OUTPUT RING/B lines indicated by 90(OUT) in FIG. 1.

Referring also to FIGS. 6–10, the housing base 60 includes a printed wiring board terminal end portion receiving cavity 92 receiving the printed wiring board terminal end portion 78 and a protection circuit grounding terminal receiving cavity 94 for receiving and positioning a protection circuit grounding terminal clip generally designated by 96. The housing base 60 includes a guide post 98 received within the receptacle 90 to facilitate assembly of the module 18 with the in-line connector base 12 and for positioning the printed circuit board terminal end portion 78. The protection circuit grounding terminal 96 is provided in electrical and mechanical contact engagement with the electrical grounding, earthing bar 12 when the module 18 is inserted into the in-line connector base 12.

Referring also to FIGS. 14–19, the housing cover 66 includes an outwardly extending end 100 defining a flange 102 and an aperture 104. Outwardly extending housing cover end 100 includes an inclined surface portion 101 providing access for a blade, such as a screw driver, to a recess 103 under the flange 102 with multiple rows 56 of installed modules 18. Both the flange 102 and aperture 104 are used to facilitate removal of the module 18 from the base 12. A pair of openings 106 are provided in the cover 66 aligned with the printed wiring board test pads 88 to facilitate testing of the protection circuit 20 carried by the printed wiring board 62. To assemble the module 18, the printed circuit board 62 carrying the electrical grounding terminal 64 is mounted in the housing base 60. Then the printed circuit board 62 is inserted into the housing cover cavity 68 from an open base mating end 108 of the housing cover. Each opposed sides 110, 112 of housing cover 66 includes a thumb grip 114, 116, respectively to facilitate removal of the module 18 from the base 12. A generally smooth, central raised portion or strip 120 and 122 is provided in the thumb grips 114, 116 so that adjacent modules 18 do not interlock when a module is being inserted or removed from the base 12.

While the present invention has been described with reference to the details of the embodiments of the invention shown in the drawing, these details are not intended to limit the scope of the invention as claimed in the appended claims.

What is claimed is:

1. A telephone and data communications line conditioner system for use with an in-line wire terminating base for terminating a plurality of telephone line pairs, said line conditioner system comprising:

a unitary electrical grounding, earthing bar extending along the length of the in-line wire terminating base, said electrical grounding, earthing bar including a pair of electrical grounding terminals received in electrical and mechanical contact engagement with an electrical grounding member of the in-line wire terminating base; said electrical grounding, earthing bar having an elongated straight plate portion extending between said pair of electrical grounding terminals;

an integral module including a printed wiring board carrying protection circuitry for conditioning a single telephone line pair; said protection circuitry including an electrical grounding terminal;

said printed wiring board including a terminal end portion having a first pair of contacts for connecting with an INPUT TIP/A line and an INPUT RING/B line and a second pair of contacts for connecting with an OUTPUT TIP/A line and an OUTPUT RING/B line;

said integral module including a unitary base and a unitary, outwardly extending cover, said base and said cover cooperatively defining a cavity for containing said printed wiring board; and said base defining a printed wiring board terminal end portion receiving cavity receiving said printed wiring board terminal end portion and a protection circuit grounding terminal receiving cavity for receiving and positioning said protection circuit grounding terminal in electrical and mechanical contact engagement with said electrical grounding, earthing bar.

2. A telephone and data communications line conditioner system as recited in claim 1 wherein said first pair of contacts and said second pair of contacts are disposed on opposite sides of said printed wiring board terminal end portion, and wherein said printed wiring board includes at least one integrally formed test pad spaced apart from said printed wiring board terminal end portion.

3. A telephone and data communications line conditioner system as recited in claim 1 wherein said base includes a guide post extending outwardly past said printed wiring board terminal end portion receiving cavity for positioning said printed wiring board terminal end portion within the in-line wire terminating base.

4. A telephone and data communications line conditioner system as recited in claim 1 wherein said base and said cover include cooperating means for snap-fit engagement together.

5. A telephone and data communications line conditioner system as recited in claim 1 wherein said unitary base and said unitary, outwardly extending cover are formed by molding of a synthetic, electrically insulating material.

6. A telephone and data communications line conditioner system as recited in claim 1 wherein said printed wiring board includes at least one integrally formed test pad and wherein said cover includes at least one opening aligned with said integrally formed test pad to facilitate testing of said protection circuitry.

7. A telephone and data communications line conditioner system as recited in claim 1 wherein said unitary electrical grounding, earthing bar is a stamped and formed metal member.

8. A telephone and data communications line conditioner system as recited in claim 1 wherein said electrical grounding terminals of said earthing bar includes locking ledges for attachment with said in-line wire terminating base.

9. A telephone and data communications line conditioner system as recited in claim 1 wherein said cover includes a first wall and a second, opposed wall extending in spaced apart planes generally parallel to said electrical grounding, earthing bar, each including thumb grips to facilitate removal of the integral module from the in-line wire terminating base.

10. A telephone and data communications line conditioner system as recited in claim 9 wherein said thumb grips include a smooth raised portion.

11. A telephone and data communications line conditioner system as recited in claim 1 wherein said cover includes a first end mating with said base and a second opposed end, and wherein said second opposed end includes an aperture to facilitate removal of the integral module from the in-line wire terminating base.

12. A telephone and data communications line conditioner system as recited in claim 11 wherein said second opposed end includes an outwardly extending flange to facilitate removal of the integral module from the in-line wire terminating base.

13. A telephone and data communications line conditioner system as recited in claim 12 wherein said second opposed end includes an inclined surface portion for providing access to said flange.

14. A telephone and data communications line conditioner system for use with an in-line wire terminating base for terminating a plurality of telephone line pairs, said line conditioner system comprising:

a electrical grounding, earthing bar extending along the length of the in-line wire terminating base, said electrical grounding, earthing bar including a pair of electrical grounding terminals received in electrical and mechanical contact engagement with an electrical grounding member of the in-line wire terminating base;

an integral module including protection circuitry for conditioning a single telephone line pair; said integral module including a unitary base and a unitary, outwardly extending cover, said base and said cover cooperatively defining a cavity for containing said protection circuitry; and said unitary, outwardly extending cover including a first end mating with said unitary base and a second opposed end, and said second opposed end includes a flange to facilitate removal of the integral module from the in-line wire terminating base.

15. A telephone and data communications line conditioner system as recited in claim 14 wherein said electrical grounding, earthing bar includes an elongated straight plate portion extending between said pair of electrical grounding terminals.

16. A telephone and data communications line conditioner system as recited in claim 14 wherein said electrical grounding, earthing bar is a unitary, stamped and formed metal member; and wherein a strengthening indent is formed in said elongated straight plate portion.

17. A telephone and data communications line conditioner system as recited in claim 14 wherein said cover second opposed end includes an aperture to facilitate removal of the integral module from the in-line wire terminating base.

18. A telephone and data communications line conditioner system as recited in claim 14 wherein said cover second opposed end includes an inclined surface to facilitate access to said flange.

19. A telephone and data communications line conditioner system as recited in claim 14 wherein said protection circuitry is carried by a printed wiring board contained within said unitary base and said unitary cover; and wherein said printed wiring board includes at least one integrally formed test pad and wherein said cover includes at least one opening aligned with said integrally formed test pad to facilitate testing of said protection circuitry.

* * * * *